Sept. 16, 1969 J. E. COX ET AL 3,467,780

AUTOMATIC SWITCHING NETWORK

Filed Oct. 21, 1965 7 Sheets-Sheet 1

JOHN E. COX INVENTORS
G.L. HASSER-G.J. BOEHM-S.J. WESTHEAD
T.F. BUCK- THEODORE FELDMAN
By
ATTORNEY

AUTOMATIC SWITCHING NETWORK

Filed Oct. 21, 1965 7 Sheets-Sheet 2

| | 1 | G1 2 | G2 3 | 4 | 5 | 6 | 7 | 8 | 9 | 10 |
|---|---|---|---|---|---|---|---|---|---|---|
| 1 | ② 2 | ① 6 | ②⑤ 3,4 | ②⑤ 8,1 | ③④ 5,7 | ① 9 | ① 12 | ②⑤ 14,15 | ③④ 11,13 | ③④ 16,10 |
| 2 | ② 1 | ① 5 | ②⑤ 7,8 | ③④ 4,6 | ⑤⑤ 2,3 | ① 11 | ① 16 | ②⑤ 13,14 | ③④ 10,12 | ③④ 15,9 |
| 3 | ① 2 | ① 7 | ②⑤ 4,5 | ③④ 1,3 | ③④ 6,8 | ① 10 | ① 15 | ②⑤ 12,13 | ③④ 9,11 | ③④ 14,16 |
| 4 | ① 3 | ① 8 | ②⑤ 5,6 | ③④ 2,4 | ③④ 7,1 | ② 9 | ① 13 | ②⑤ 15,16 | ③④ 12,14 | ⑤⑤ 10,11 |
| 5 | ① 1 | ① 4 | ②⑤ 6,7 | ③④ 3,5 | ③④ 8,2 | ② 10 | ① 14 | ②⑤ 11,12 | ②⑤ 16,9 | ③④ 13,15 |

INLET No.

WHERE P(M) : PRIMARY SW. P, OUTLET M
GRADING PATTERN 80 TO 50

AUTOMATIC SWITCHING NETWORK

Filed Oct. 21, 1965

AUTOMATIC SWITCHING NETWORK

Filed Oct. 21, 1965

United States Patent Office 3,467,780
Patented Sept. 16, 1969

3,467,780
AUTOMATIC SWITCHING NETWORK
John E. Cox, George L. Hasser, Guenter J. Boehm, Stanley J. Westhead, Theodore Feldman, and Thomas F. Buck, Nutley, N.J., assignors to International Telephone and Telegraph Corporation, Nutley, N.J., a corporation of Delaware
Filed Oct. 21, 1965, Ser. No. 500,381
Int. Cl. H04m 3/00
U.S. Cl. 179—18 13 Claims

ABSTRACT OF THE DISCLOSURE

A switching network wherein the concentration and direction switching functions are separated into individual switching stages. Unique cable harnesses connect the separated switching stages and provide a homogeneous flow of traffic even when additional stages are added. The heart of the system is the relatively small matrices with dimensions that are uniform for each stage. The system is equipped to handle different types of signalling, such as D.C. signalling, tone signalling and voice frequency pulse signalling.

This invention relates to automatic switching systems and more particularly to common controls for systems utilizing either completely or partly self-seeking networks.

These controls are particularly—although not exclusively—adapted for use with a network of glass reed relay matrices of the type shown and described in a co-pending application entitled "Glass Reed Switching System," Ser. No. 463,224, filed June 11, 1965 by G. J. Boehm and assigned to the assignee of this invention.

A glass reed network is a combination of crosspoints or switching elements connected between a plurality of inlets and outlets. The function of the common controls is to cause the network to close the crosspoints and thereby establish a switch path from any inlet to a desired outlet. For convenience of expression, this function may be called the "selection function." If the network is completely self-seeking, it is only necessary for the common controls to apply end-markings of opposite polarity at the desired inlet and outlet, respectively, of the network. The crosspoints then select and close themselves, free of any external in-network control, to complete the desired connection. If the network is partly self-seeking, the common controls may make an in-network selection at a particular stage, and the cross-points are made self-seeking in other stages.

Heretofore, self-seeking networks have used electronic crosspoint devices embodying the sophisticated characteristics which are inherent to such devices. Unfortunately, these same characteristics have also tended to limit the signal carrying capability of the crosspoint. Thus, circuit designers have sometimes turned to glass reed relay matrices controlled by computer-like devices. In these matrices the control of the crosspoint and the circuit carrying the signals are separated. Therefore, a first problem is to provide a computer which can carry out the logical functions required by the network without unduly increasing the system cost.

Generally speaking, in its broadest aspects, this or almost any switching network may be described by the symbol of an X. Connected at the left-hand and right-hand edges of this X are many things, such as telephone subscriber lines. A few things, such as control links, are connected in the center where the lines meet. Thus, the purpose of the network is to concentrate switching traffic from the many things on the left to the few things in the center and then to expand the traffic to the many things on the right. This may be called the "concentration function." For example, in a step-by-step system, the finders concentrate and the selectors expand telephone traffic. In a crossbar or similar system, the primary spread provides the traffic concentration, and the secondary spread provides the traffic expansion.

Continuing with the description of a network as represented by the symbolic letter X, the two left and right triangular-shaped areas enclosed by the arms of the X represent the number of crosspoints used in the network. The efficiency of the network increases as the area of these triangles reduces. Thus, an object of any well designed network is to reduce the area of these triangles to a minimum for a given grade of service. This minimum area is usually fixed not only by the amount of concentration function, but also by the path options required in the switching function required to extend a connection in a given direction.

Heretofore, most efforts to reduce the number of crosspoints (i.e. to increase the efficiency of the network) have been directed to improvements in the efficiency of the concentration function. The switching function has been treated as an inherent by-product of the concentration process.

According to this invention, further reduction of the number of crosspoints and improvement of the network efficiency is achieved by separating the concentration and switching functions.

An object of the invention is to provide new and improved automatic switching systems. In this connection, an object is to provide low cost, common controls for a number of matrices which may be self-seeking—at least in part. More particularly, an object is to provide common control circuits which enable the network to provide many call features.

A further object is to provide a relatively large capacity switching network which shares its common controls on an economical basis. More particularly, an object is to separate the concentration and switching functions to increase the network efficiency. Here, an object is to reduce the computer functions into a plurality of sub-functions which simplifies the design of the common controls. Also, an object is to reduce the common controls to a number of sub-circuits which are selectively associated with each other only when the functions are required and then released for other uses as soon as the functions are no longer required.

In keeping with one aspect of the invention, these and other objects are accomplished by providing a pair of switching stages interconnected by a control link. One switching stage concentrates traffic, and the other switches it directionally. The controls are divided into sub-circuits. For example, the control link is connected to a suitable register by a marker. The register circuit may, in turn, call in other equipment as the call is extended. In this manner, a few highly specialized component circuits may serve many calls.

The above mentioned and other features of this invention and the manner of obtaining them will become more apparent, and the invention itself will be best understood by reference to the following description of an embodiment of the invention taken in conjunction with the accompanying drawings, in which.

Figures 1, 2:
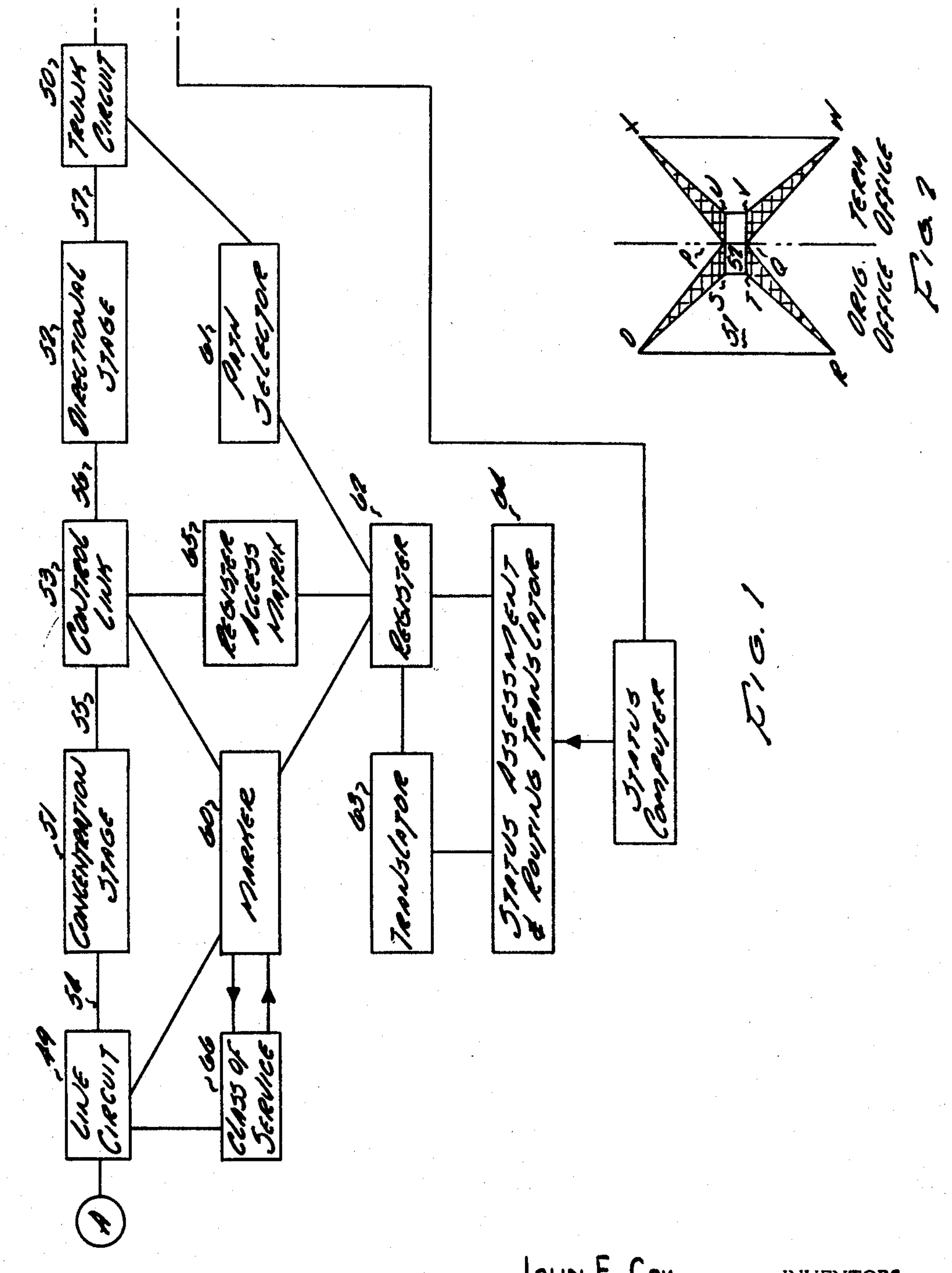
FIG. 1 is a block diagram showing an entire switching system and the sub-circuits required to perform logical functions provided for a switching network by a common control circuit.
FIG. 2 is a symbolic disclosure of a switching network which illustrates how the concentration and switching functions of the network have been separated to promote crosspoint efficiency.

FIG. 1 shows a subscriber line A and associated line circuit 49 which may be a calling line and a trunk circuit 50 which may be viewed either as a called line or an outlet to additional switching equipment. The system network includes two switching stages 51 and 52, interconnected by a control link 53. The network stage 51 concentrates traffic from many lines (such as A) to a few links (such as 53). The stage 52 directionally switches traffic from the links to any desired outlet. Each of these switching stages has inlets on one side and outlets on the other side. Thus, by way of example, one of the inlets of stage 51 appears at 54 and one of the outlets appears at 55. In like manner, an inlet and an outlet of stage 52 appear at 56 and 57 respectively. The outlets of the concentration stage 51 are coupled to the inlets of the directional stage 52 via a control link (such as 53).

The concept of separate concentration and directional switching is shown symbolically in FIG. 2. Heretofore, the primary switching stage concentrated traffic through an array of crosspoints symbolically indicated by the area O, P, Q, R. In doing so, the system also operated the crosspoints in a manner which selected the particular inlet and outlet which were to be interconnected, thereby performing a directional switching function as a by-product of the concentration.

With the inventive concept, the network stage 51 primarily does the concentration as indicated by the area O, S, T, R in FIG. 2. Stage 51 is not concerned with selecting an ultimate destination for the traffic but merely selects any idle control link which is then available. Traffic is, therefore, extremely well concentrated at the outlets S, T and sent out over a very small number of heavily used control links to a directional switching stage S, T, P, Q where the directional path selection is made.

Thus, the concentration traffic in network 51 is given its freedom to seek any available inlet at S, T. The direction of the switch path is selected in the switching network P, Q, S, T without regard to concentration requirement.

The inventive result is a crosspoint savings represented in FIG. 2 by the cross-hatched areas O, P, S and Q, R, T. It should be noted that one crosspoint savings occurs in the concentration stage 51 because any outlet may be seized regardless of the direction of switching. This provides a very small number of extremely efficient outlets. Because the outlets are reduced in number, the directional switching stage does not have to be as big as it would have been in prior art systems. Thus, there is also a savings of crosspoints in the directional stage. Moreover, at the distant end of the trunk line, the terminating office also reflects a savings in cross-points as indicated by the area P, Q, W, X.

FIG. 2 is provided to explain the principle and not to illustrate any real system. Thus, no conclusion should be drawn from the shape or angle in which the lines are drawn. They are here shown as straight lines, but they would probably kink at every matrix stage.

Figures 3, 4:
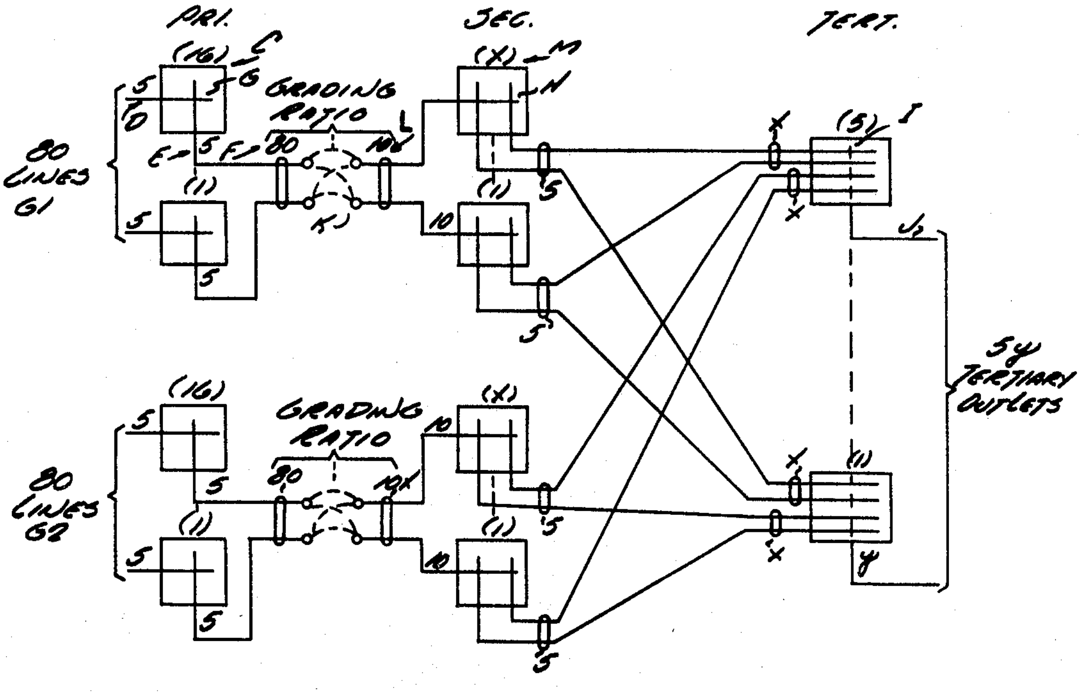
FIG. 3 is a schematic circuit showing how the concentration stage is arranged.
FIG. 4 is a table explaining the concentration layout of the stage of FIG. 3.

To further increase the efficiency of the concentration network 51, it is comprised of a plurality of small fully equipped square matrices, interconnected as shown in FIG. 3. The small, square matrices are desirable because the network may grow with smaller increments and the inlets may be used more efficiently. However, because of their smallness, they no longer display the traffic characteristics of a true statistical sample. Therefore, it is necessary to provide inter-stage wiring which will tend to make the traffic more homogeneous.

In greater detail, the network is shown in FIG. 3 as a three-stage cascaded array of crosspoints arranged in rectangular matrices. In keeping with normal matrix symbology, the three stages are designated primary (PRI), secondary (SEC), and tertiary (TERT). The numbers at the top of each matrix tell how many matrices appear in each stage. For example, the designation 16 appearing at C indicates that there are sixteen primary matrices for every eighty line group G. The number 5 at D and E indicates that each matrix has five inlets and five outlets, respectively. The number 80 appearing at F indicates that there are eighty outlets from the sixteen primary stage matrices. The function of each of these stages is to close crosspoints, as at G, H, and I to complete a path from an inlet (as at D) demanding service to an outlet such as J.

To provide a homogeneous flow of traffic, an inter-stage grading cable is provided at K.

This grading is accomplished by providing a number of standard cable types, each having identical plug endings so that any suitable number of primary outlets may be connected to any suitable number of secondary inlets. Thus, for example, one cable might connect eighty primary outlets to forty secondary inlets; another cable might connect eighty outlets to fifty inlets, etc. The intra-cable wiring is arranged to distribute the flow of inter-stage traffic so that the output from the secondary stage (SEC) is homogeneous despite the fact that the primary matrices are very small 5 x 5 (five inlets and five outlets) units.

FIG. 4 gives a practical example of one exemplary intra-cable wiring pattern which will provide a homogeneous flow of traffic when the primary stage has eighty outlets and the secondary stage has fifty inlets. As indicated by the legend in FIG. 4, the integer in the table of FIG. 4 identifies a particular primary switch; for example, the number 16 would identify the sixteenth switch which is designated at C in FIG. 3. The circled exponent number identifies the outlet on the switch; for example, this may be one of the five outlets shown at E in FIG. 3. The columns (FIG. 4) are numbered 1–10 to represent the ten inlets of the secondary stages shown at L in FIG. 3. The rows (FIG. 4) are numbered 1–5 to identify the secondary switches, such as that indicated at M in FIG. 3. Thus, the numbers in box B1 in FIG. 4 indicate that the first outlet on the sixth primary switch is connected to the second inlet on the first secondary switch.

Since there are eighty primary outlets and fifty secondary inlets, some inlets must be connected to two outlets. For example, as indicated in box B2, the second outlet on the third primary switch and the fifth outlet on the fourth primary switch are connected to the same third inlet on the first secondary switch.

If the pattern of FIG. 4 is traced, it will be learned that the wiring pattern was laid out according to the following rules:

(1) Subtract the number of secondary inlets from the number of primary outlets to discover the number of surplus outlets which will be connected to inlets using plural wirings extending from the inlets.

(2) Divide the number found in step 1 by the number of secondary switches and if the answer includes a fraction raise it to the next highest integer. This gives the number of inlets per secondary switch which will require dual windings for connection to the surplus outlets of the primary switches.

(3) Wire all inlets of the secondary switches to an outlet on the primary switches in a standard 1 to 1 pattern until all inlets of the secondary switches have been wired individually to outlets on the primary switches, leaving surplus primary outlets unwired.

(4) Connect the surplus primary outlets to inlets on the secondary switches by using double or triple wires extending from the number of inlets per switch found in step 2 by:

(A) Chain connecting secondary inlets from the top (inlet 1) down (inlet 10) to establish a normal order of inlet preference selections. By chain connecting, it is meant that if one of the secondary inlets is selected the succeeding inlets are "blocked," for example.

(B) Connect the last (lowest preference) of the surplus primary stage outlets with the last (lowest preference) secondary stage inlet by doubling the connections on the selected number of inlets to connect those inlets to the surplus outlets.

(C) Continue repeating step 4(B) by combining inlet and outlet connections in an inverse order of preference until all surplus primary outlets have been used up.

(D) On the line side of the primary switches connecting the heaviest traffic users to the upper inlets and the lightest traffic users to the lower inlets in the primary stages with intermediate traffic users connected in order of usage.

Looking at FIG. 3, one can see the following advantages:

(1) All matrices are identical for any given stage. The primary stage matrices are the highly desired, very small, square configurations.

(2) By adding these small primary matrices, any number of lines may be added in small increments (here five) to provide almost any number of inlets up to a standard size line group (here eighty lines per group).

(3) The traffic through the individual line groups may vary in accordance with the users needs. The only changes required in the network being the addition or subtraction of secondary stages and the selection of a proper harness cable adapted to interconnect the resulting number of primary outlets and secondary inlets. For example, the outlet to inlet ratio may be 80:40 in group G1 and 80:70 in group G2 because the subscribers in group G1 do not use their equipment as much as the subscribers in group G2 use their equipment.

(4) All of this grossly dissimilar traffic is mixed in the tertiary stage so that the outflow from the tertiary outlets is a homogeneous traffic pattern which obeys a statistical averaging curve. Moreover, since the outflow has not yet been segregated with respect to its designation, any idle terminal is available for use.

The nature of the system which utilizes this matrix will become more apparent from a study of the remaining components in FIG. 1. Most of these components are well known to those skilled in the art.

The control link 53 provides two of the end-markings required to complete a path through the switching stages 51 and 52. After the path has been completed, the control link provides any battery connections required for transmitting signals over the path. Finally, the link contains the supervisory equipment required to hold the path as long as it is required and to release it when it is no longer needed.

Logic circuitry (not shown in detail) is provided for applying the end-markings to the inlet and outlet of the desired path. The logic circuit 60 for the concentration switching stage 51 is here called a "marker." The logic circuit 61 for the directional switching stage 52 is called a "path selector." Two different terms are used as names for these circuits primarily to provide definite associations with particular pieces of equipment that are controlled by them. Each of these circuits performs a similar function although they are specifically designed for concentration and direction switching respectively. This makes it possible to provide simpler, more reliable and less expensive circuits.

A register 62 receives and processes the data which controls the establishment of a switch path. This data includes the information required to select the called station or trunk and to complete a call. When necessary, a translator 63 is employed by the register to translate this data into an identification of the equipment actually used in the desired path. A status assessment and routing translator 64, with an associated status computer, detects conditions which preclude a completion of the path and then reroutes the call over an alternative path. Examples of circuitry for providing this function are found in co-pending patent applications entitled "Network Status Intelligence Acquisition, Assessment and Communication," Ser. No. 440,436, filed Mar. 17, 1965 by Halina-Haigh, and Litchman; and "Routing Translator," Ser. No. 456,300, filed May 17, 1965 by George L. Hasser. Both of these applications are assigned to the assignee of this invention.

A register access matrix 65 selectively interconnects the control link 53 with the register 62. A connection to an idle translator 63 is requested when required by the register. Thus, a register and a translator may be assigned for their normal respective holding times to perform their separate functions to serve individual calls.

The system operation may be described by use of FIGS. 5–15 which are a series of block diagrams based on FIG. 1. These figures identify the circuits which are logically performing a function at any given time.

Figures 5, 6, 7:
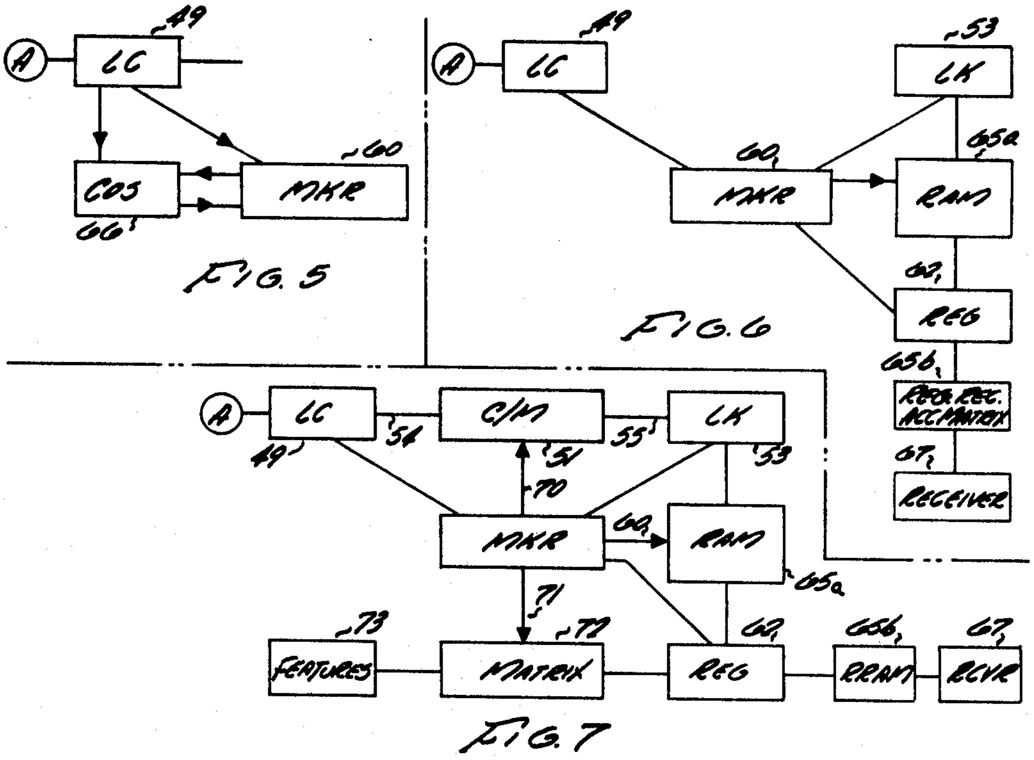
FIGS. 5–15 are a series of block diagrams based on FIG. 1 and arranged to show the sequence of events required to establish a call through the system of FIG. 1.
Figure 8:
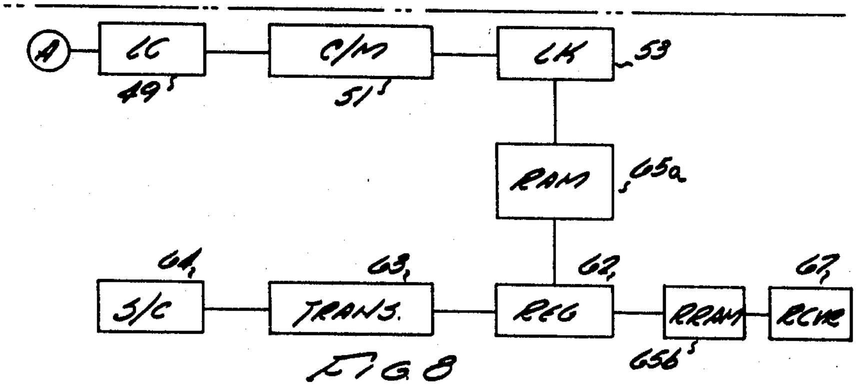
Figure 9:
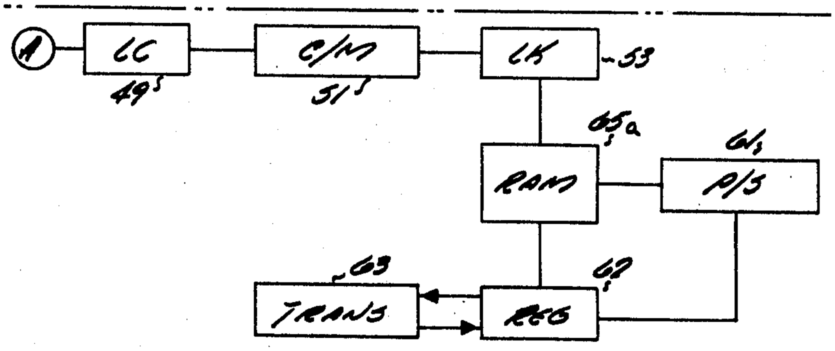

First, a calling station A, in FIG. 5, places a demand upon the network—i.e., a telephone station goes off-hook or a teleprinter is operated. The line circuit 49 detects the demand and calls in the marker 60. The marker seizes a class of service detector circuit 66 and exchanges data with it. The class of service circuit 66 controls the marker 60 in accordance with signals received from the line circuit 49 to store an indication of any restrictions placed upon, or services given, to line A. A signal indicating the class of service is passed to and stored in the selected idle register 62 for use by markers and translators in restricting calls, checking compatibility of services offered, available trunk bandwidths, etc., and other controlling functions.

Then (FIG. 6), the marker selects an idle one from among many control links 53 which are capable of serving the calling line. Thereafter, the marker places a demand upon a digit receiver, a register, and the link. The demanded register 62 and receiver 67 are connected into the circuit via suitable access matrices **65*a* and 65*b*, respectively. The receiver 67 is a device which is appropriate to the class of service given to the calling party. The nature of the register receiver selected by the register receiver access matrix 65*b*** depends upon the kind of line signalling equipment at the calling station. For example, one kind of register receiver may be selected for D.C. pulsing and another kind of register receiver may be selected for voice frequency pulsing. Yet another kind of register receiver may be selected for "Touch-Tone" signalling. All receivers are in the common pool of registers and connected via the register receiver matrix.

It should be noted that the invention thus allows a complete flexibility so that the system may interface with any other type of equipment because the register receiver access matrix **65*b* allows the register 62 to associate itself with any type of receiver equipment 67**.

After selection of the link and register (FIG. 7), the marker applies or causes to be applied end-markings at the appropriate inlet 54 and outlet 55 of the concentration stage 51. Also, the marker 60 applies any enabling signals at 70 and 71 which may be required for network operation. Responsive to these end-markings, and perhaps to the signals at 70 and 71, paths are completed across stage 51 and matrix 72. An example of a path selector using signals at 70, 71 is described in detail in the above-mentioned co-pending application entitled "Glass Reed Switching System." Alternatively, the switching network could be completely self-seeking and not use the signals at 70, 71. Any features circuit 73, required by the call, is now connected to the marker and register. For example, the features circuit may be designed to receive and respond to certain kinds of control signals from the register 62 to provide executive right-of-way, camp-on busy, or the like.

Upon completion of the paths across the switching stage 51 (FIG. 8) and matrix 72, the marker 60 drops out of the connection. The register 62 signals the calling station A—as by sending dial tone—to indicate that the directory number control signals may be sent. Then, the calling subscriber transmits any suitable signals, such as dial pulses, which are received by the receiver 67, converted to any suitable standard form and stored in the register 62. After all digits are received, the receiver 67 is released from the connection.

After a sufficient number of digits are stored, the register 62 seizes the translator 63 (FIG. 9) and exchanges data with it. The translater responds to the register by designating the trunk group and type of sender which is to be used to extend or complete the call, as taught by the above identified Hasser application. Using this equipment designation, the register 62 seizes a path selector 61 which is capable of controlling the designated equipment. Also, the register 62 passes to the path selector the kind of a sender equipment which is required, e.g., a D.C. pulse or V.F. pulse sender; a fast or a slow sender; a "Touch-Tone" sender, etc. Then, the path selector 61 operates matrix 75 (FIG. 10) to connect the register 62 with the type of sender that is required to interface with the equipment connected to the distant end of the trunk line 77.

Again, it should be noted that the register and sender are separate from each other and from other equipment. Each is given separate access, through a separate matrix, to the other equipment. Thus, this inventive system may be made to interface with any associated systems.

Figure 10:
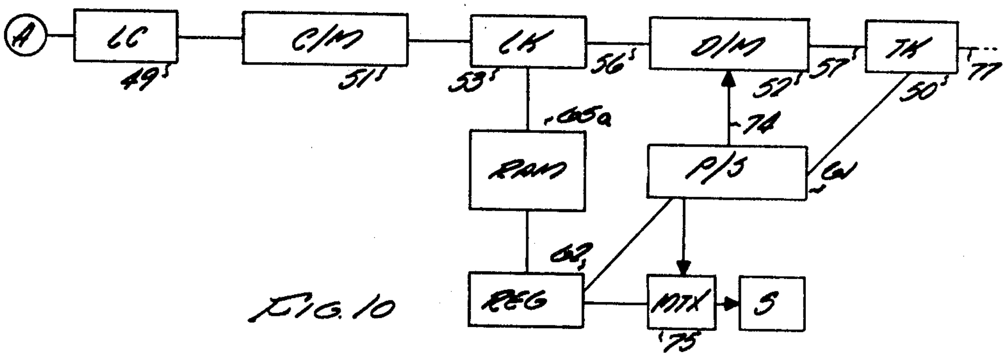
Figure 11:
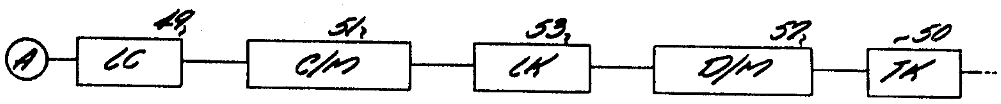

As shown in FIG. 10, the register requests the path selector 61 to select a free trunk circuit 50 from among a group of trunk circuits leading to a desired distant office. This trunk is here assumed to be the designated equipment. As soon as this selection is completed, end markings are applied to the directional switching matrix 52 via the wires 56 and 57. Also, any required enabling signals are sent to the switching stage via conductor 74. Multiple application may be made to the translator to obtain more digits for the sender. Thereafter, the sender transmits signals representative of the digits stored in the register 62. These digits may be received by the resistor 62 from either the subscriber or from the translator. Or, the subscriber dialed digits may be deleted, substituted, prefixed, or suffixed in accordance with the translator program.

As soon as the sender has transmitted all of the necessary digits, the call may be completed (FIG. 11), via line circuit 49, concentration matrix stage 51, control link 53, directional switching stage 52, and trunk circuit 50. All of the rest of the control equipment drops out. For the duration of the call, the control link 53 provides all necessary power supply and call supervision. After the call is over and the service demanding station A releases—as by going on-hook—the control link 53 restores all equipment to normal. The system may be supplied with a first party release.

On certain types of calls, the register sender combination may remain in the connection until the called subscriber terminal is reached. The register sender so retained is used for purposes of checking the called party identity, etc. After this checking, the register sender releases from the connection.

Local calls follow the logic disclosed by FIGS. 5–9. However, the translator 63 responds to signals stored in the register by giving an equipment designation which indicates that the call is to be completed in the local office. No sender is required on local calls, and the receiver releases as soon as all digits are received. Thereafter, the system follows the logical steps disclosed in FIG. 12, et seq. During the description of these logical steps, it will be convenient to show some equipment twice since it performs two functions. However, this does not mean that the same equipment will be duplicated. For example, the concentration matrices 51 and 83 may be the same network used twice.

After the translator 63 designates the local equipment required to complete the call, the register 62 (FIG. 12) calls in the marker 80 and begins to transfer to it the data required to complete the call. As soon as the marker has received enough data to identify the local called line B, it checks the compatibility of the calling and called classes of service. Then it designates a terminating link 81 and selects the called line circuit 82 if it is then idle. If the called line is busy, the register is so informed and busy tone is returned. Thereafter, the line circuit 82 and terminating link 81 apply end-markings to the concentration matrix stage 83 via the wires 85 and 86. The marker 80 also performs any enabling function via the conductor 87. A path is now completed from line circuit 82 through the concentration matrix 83 to the terminating link 81.

Figures 12, 13:
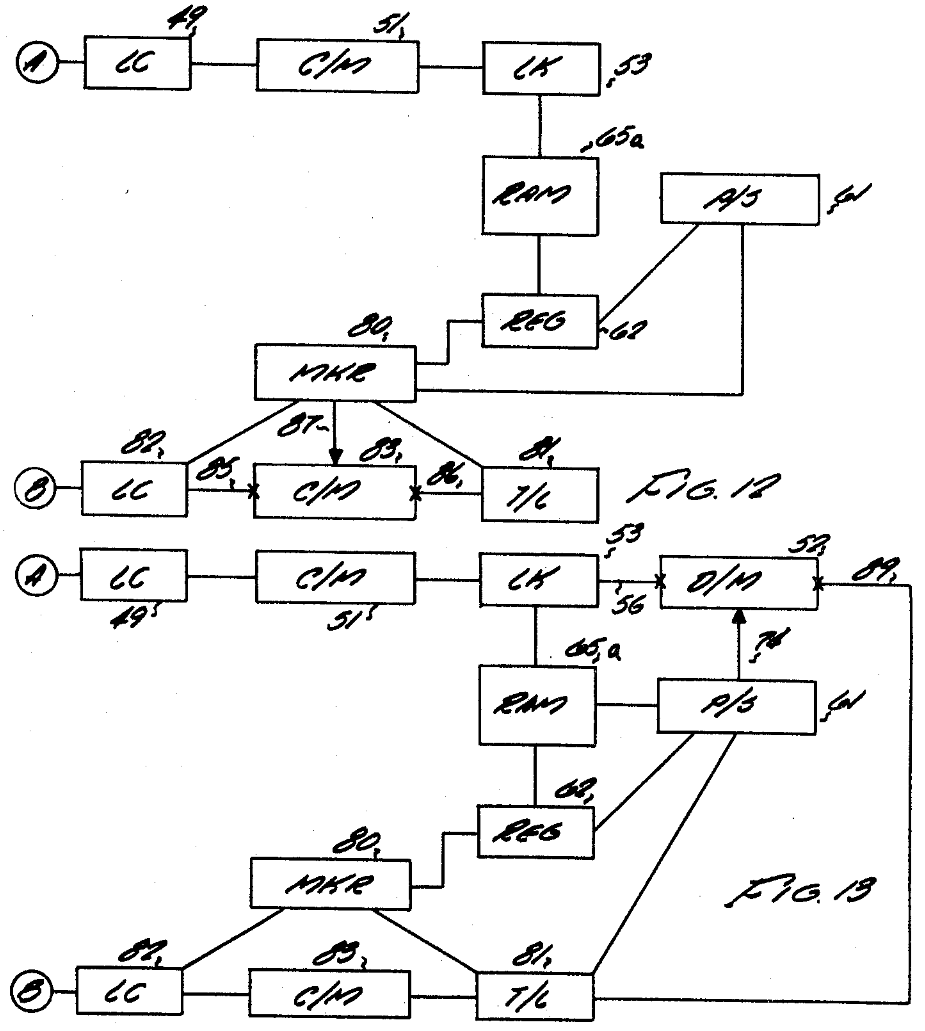
Figure 14:
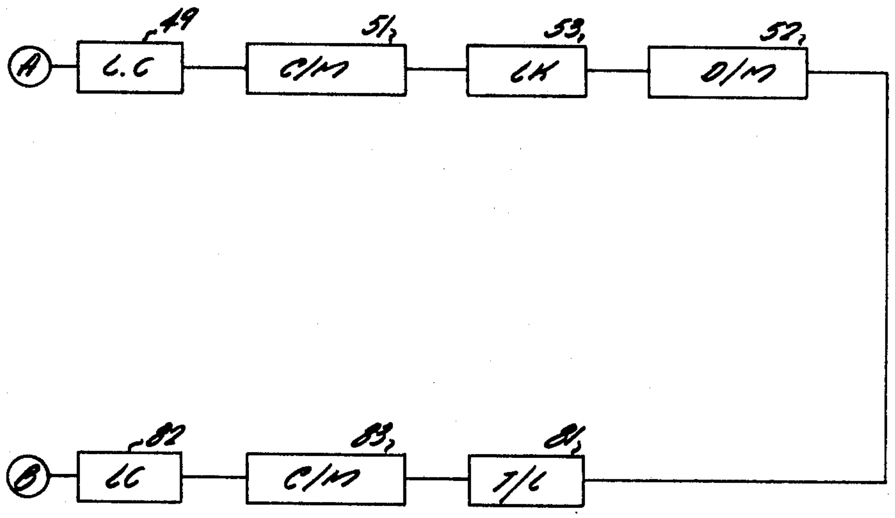
Figure 15:
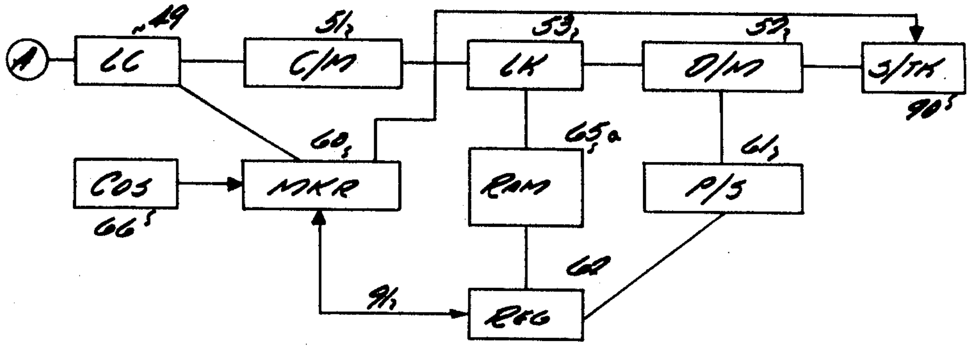

While this is going on, the marker 80 demands a path selector 61 and transfers data to it. Responsive thereto, the path selector 61 attaches itself to the terminating link 81 (FIG. 13). The path selector 61 then causes the control link 53 to apply an end-marking over wire 56 to the directional switching stage 52 and causes terminating link 81 to apply an end-marking over the wires 89 to the directional switching stage 52, while enabling the stage 52 via the wire 74. A switch path is thereupon completed through the directional stage 52. Thereafter, all common control equipment drops out and the call is completed and held over the circuits shown in FIG. 14 (i.e., calling station A, line circuit 49, concentration stage 51, control link 53, directional switching stage 52, terminating link 81, concentration stage 83, and line circuit 82 to the called line B).

Yet another call, which may be extended through the network, requires one or more special features circuits. This call also follows the logic disclosed by FIGS. 5–9. However, at that stage during the call extension, the translator 63 designates a special service trunk 90 as equipment that is required to complete the call. The nature of this special service is unimportant. It could be code call, dictation, call timing, or any other equipment, all of which is represented by the box 90. This raises the question of whether the calling line is or is not entitled to the demanded service.

To ascertain the class of the calling line, the register 62 receives, on initial seizure by the marker 60 (as indicated by the line 91) the identity and class of service data. This was derived by the marker from the calling line circuit 49 and class of service circuit 66, as in FIG. 5. The class of service circuit 66 is connected to the line circuit of the interrogated line (calling or called). Therefore, it can tell the marker 60 what kind of service is allowed to the line. The system can also forward the class of service signal to the distant end of a line where it is used to make a compatibility check. For example, government security regulations may require compatibility between the security clearance given to calling and called subscribers.

If, on terminating calls, the marker 60 finds a programmed coincidence between the demanded service and the programmed allowed service, an end-marking is applied to the called or demanded line. Similarly, the translator makes a comparison of the subscriber's class of service and the demanded service before passing data to the register permitting the call. Thus, the switching stage 52 is set to complete the connection between the line A and the trunk 90 only if the calling subscriber is permitted to receive the demanded service.

The inventive system also allows a great latitude of flexibility in system layout. For example, the description thus far has assumed a centralized switching office which provides all necessary functions. However, the distribution of user population may make remote concentrators an attractive alternative to the unified office.

A remote concentrator is located at some distance from the principal switching center. There it will concentrate and send traffic over a few very heavily used trunks to the central office where the concentrated traffic is put into the prevailing traffic pattern.

Usually, such a remote concentrator requires duplicate line circuits in both the remote concentrator and the central office. However, this duplication introduces an added expense and precludes attempts to improve overall system efficiency.

Figure 17:
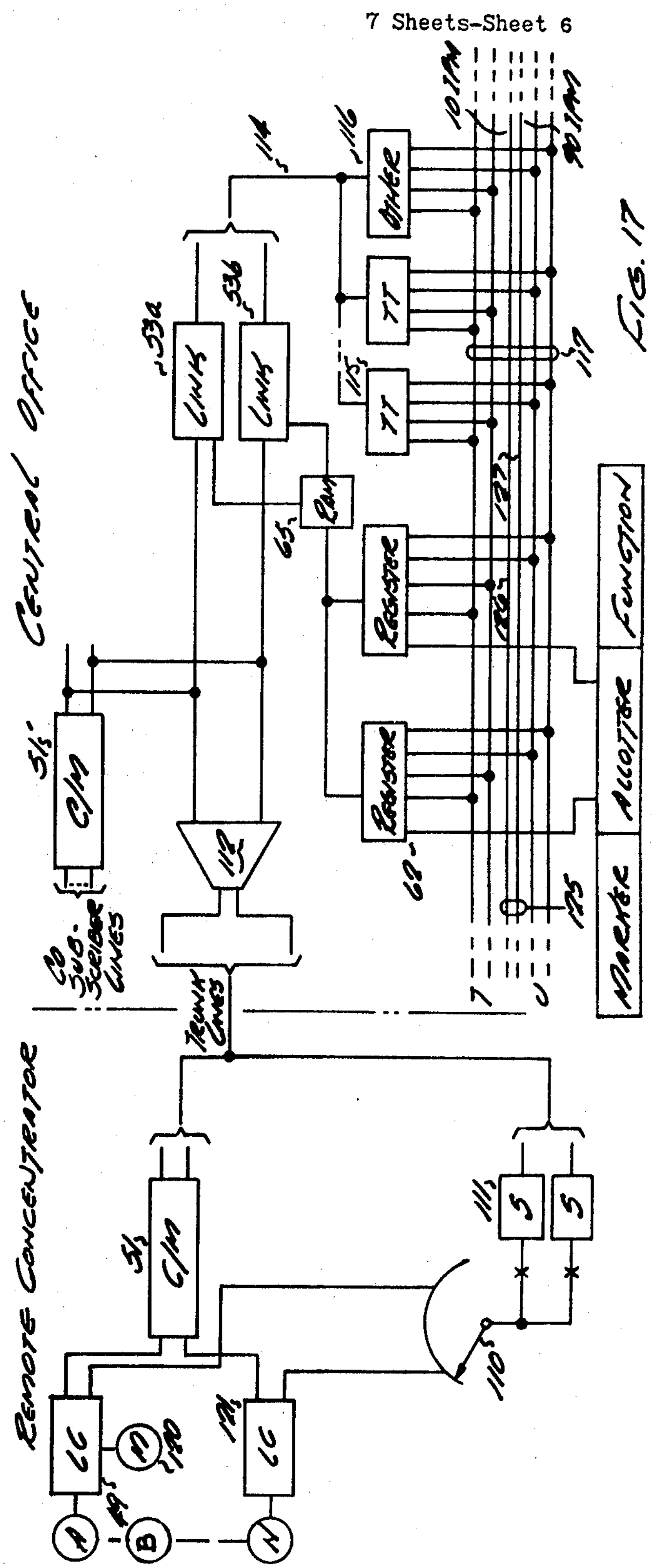

To provide remote concentration according to the invention, advantage is taken of the separation between the concentration and direction switching which is normally built into the system. The concentration portion of the system is removed to the remote concentrator location and then fed into a directional switching portion of the system located in the central office via trunk circuits, expansion matrices and control links, as shown in FIG. 17.

Figure 16:
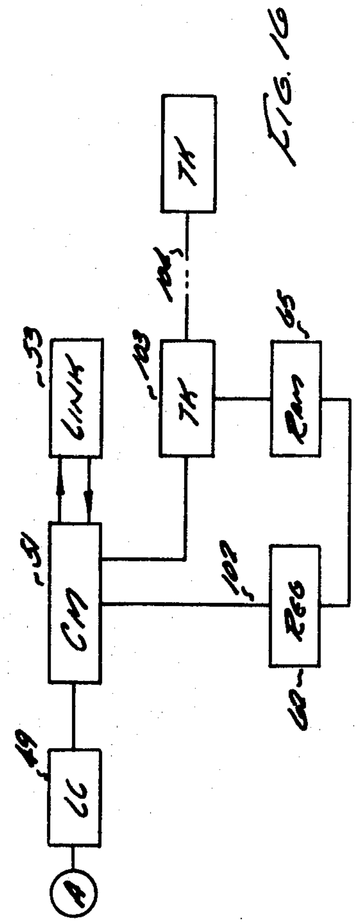
FIGS. 16 and 17 are block diagrams also based on FIG. 1 which explain how to change the scale of the system by providing remote concentrators.

The remote concentrator (FIG. 16) contains the subscriber lines A, line circuits 49, concentration matrix 51, and link 53, all of which function as described above. If the call is a local call, the link 53 receives both an originate connection 100 and a terminate connection 101.

The concentrator matrix 51 performs only the concentration switching function as described above since all trunks home onto the parent office and there is no need to select a direction.

The remote concentrator works this way. Subscriber station A goes off-hook and places a demand for service. A path is completed through the matrix 51 to the register 62 via access point 102—in the above described manner. Dial tone is returned, and the calling subscriber sends switch control signals to the register 62. There a match is made to determine whether the stored signals identify a local subscriber or a central office call. If a local call is indicated, a suitable path is completed to the link 53 and the register 62 drops out.

If the call is to either the central or a more distant office, the signals stored in the register cause the concentration matrix 51 to seize a trunk circuit 103 coupled to the central office via a trunk line 104. Next, the trunk circuit 103 re-seizes the register 62 via a register access matrix 65. Then, the previous matrix connection over access point 102 is dropped.

From this logical step, the call may proceed through the central office in the same manner as any of the above described calls.

To provide identification of lines served by the remote concentrator, the system follows the logical steps disclosed in FIG. 17.

The subscriber lines A–N in the remote concentrator connect into individually associated line circuits, such as 49. Each line circuit is individually marked with the class of service, identification, or the like, of the associated subscriber line. Thus, any well known scanner, such as scanner 110 which temporarily connects to the lines obtains the marked information from the line. Here, it is assumed—by way of example—that the identity of a calling line is required for toll ticketing purposes.

After the scanner 110 is connected to the line to be identified, it calls in the type of sender 111 which is compatible with the central office. (Perhaps D.C. pulsing and Touch-Tone multifrequency signals may be intermixed in this system; therefore, two senders are shown.)

In the central office, all traffic incoming from the remote concentrator is routed through an expansion stage 112 which provides output traffic having the same degree of concentration that is normally provided by the central office concentration matrix 51'. This way, neither the remote concentrator traffic nor the central office traffic gains an unfair advantage over the other.

The call is extended by a marker to a link circuit 53. The marker operates a register access matrix 65 to connect the link circuit 53 to a register 62 allotted to serve the next call. The register stores directory signals sent from the calling station and signals sent from the scanner 110. As soon as the register discovers the need for a toll ticketer, it causes the link 53 to place a demand over conductors 114 and seize an idle toll ticketer 115 (or any desired other functional circuit 116). Simultaneously, the register 62 causes link 53 to both enable the seized ticketer 115 and send the line identification signals over the common busses 117. For example, one "tens" digit may be sent over a group of "tens" busses T, and one "units" digit may be sent over a group of units busses U. The enabled ticketer stores these signals as an identity of the calling line.

Thereafter, the toll ticketer performs its functions in its usual manner while being controlled over the conductors 114.

According to the invention, toll charges may be made at a selected billing rate and charged either on a bulk billing basis or a call per ticket basis. For purposes of this disclosure, it is assumed that subscriber A (FIG. 17) receives bulk billing, and subscriber B receives ticketed billing. Hence, subscriber station A—but not subscriber B—has a meter 120 connected to its line circuit 49. Periodically the meter is read and subscriber A receives one bulk bill for the total call units registered thereon. Subscriber B, on the other hand, receives a ticket for every call. The meter 120 is equipped to step one billing unit every time that it receives a billing pulse. The billing pulse repetition rate, therefore, determines how much the subscriber will be charged for any given call. If the call is local, the pulse repetition rate could be, say, ten per minute. If the call is from coast-to-coast, the repetition rate could be, say, fifty pulses per minute. If only a low cost telephone is used to make the call, perhaps no increment of speed may be added to the repetition rate. On the other hand, the repetition rate may be increased sharply if, say, a wide band television channel is used. For convenience of expression, these different kinds of equipments will be referred to as "service type" to avoid confusion with "class of service" which depends upon who the subscriber is.

Figure 18:
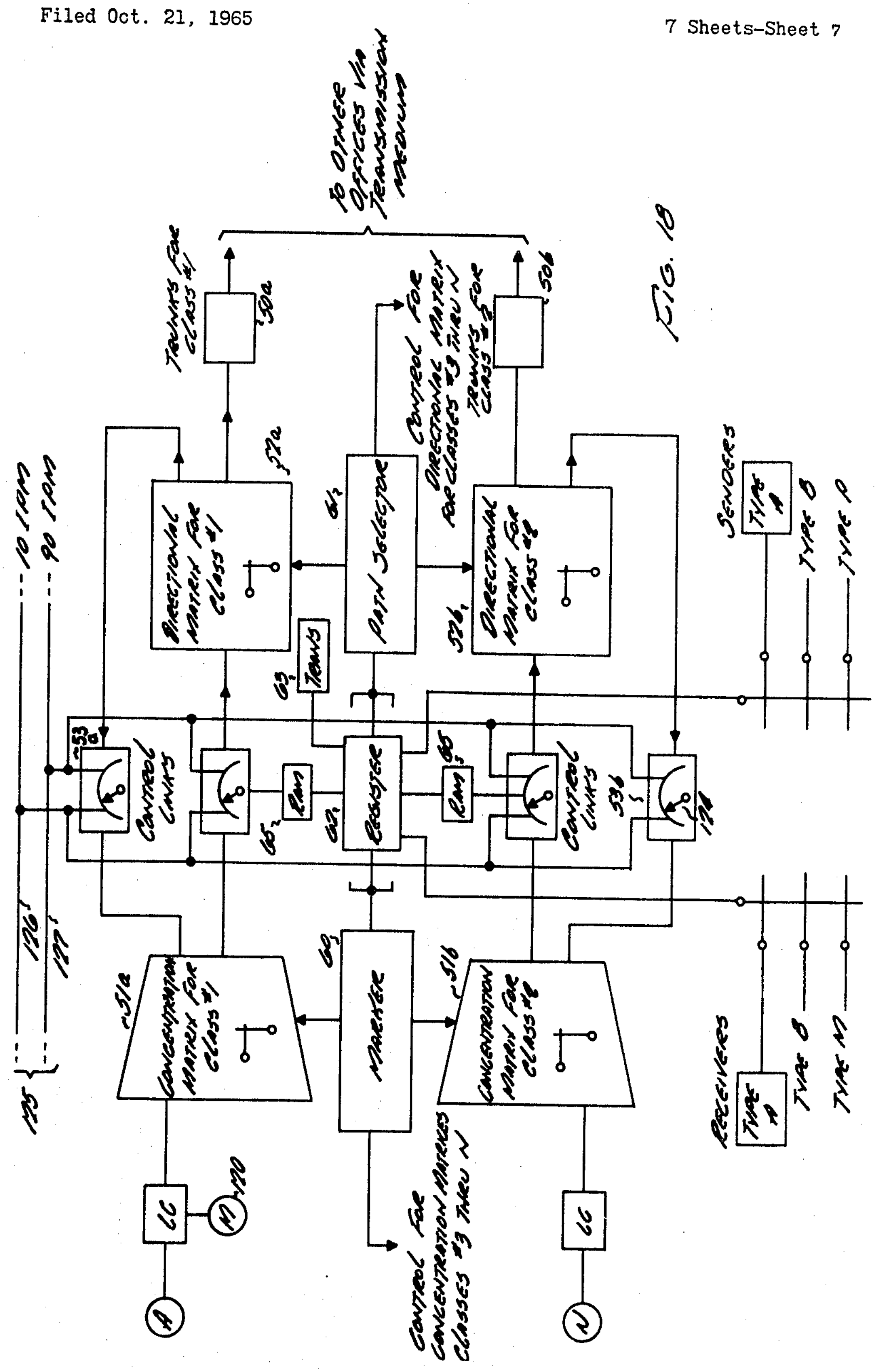
FIG. 18 is a block diagram which shows how a number of different types of circuits may be interconnected in a national network.

The nature of this service type of equipment may become more apparent from a study of FIG. 18. The reference numerals in FIG. 18 are the same as those used elsewhere to identify similar equipments except that a letter suffix is added to identify different service types. Thus, the suffix *a* could identify narrow band telephony service type of equipment and the suffix *b* could identify wide band television service type of equipment. This is, of course, an exemplary assignment of service type selected to illustrate the problem. The suffix *a* could identify analog service type of transmission equipment and the suffix *b* could identify digital service type of equipment. The point is that the system is capable of transmitting mixed kinds of signals through different service type of equipments.

Each service type signal is transmitted over equipment unique to its need. Thus, for example, four completely separate service type transmission systems are used to transmit, say, telegraph, voice, computer readout, and television. The central office receiving any signals knows what service type of signals it is receiving because it can receive only one such type over any one trunk line.

According to the invention, a single pool of common control equipment may operate the switching apparatus for all service types of equipment. Thus, the marker 60 may control either the narrow band concentration matrix **51*a* or the wide band concentration matrix 51*b*. The path selector 61 may control either the narrow band directional matrix 52*a* or the wide band directional matrix 52*b*. Register 62** may store switch directing signals on any service type of call. In like manner, all common equipment can be used on any call.

The pulse repetition rate for billing calls using the narrow band service type of equipment **51*a*** may be, say, ten pulses per minute, and the rate for billing calls using the wide band service type of equipment may be, say, forty pulses per minute. Since, as already pointed out, the billing rate also changes as a function of changes in distance, the equipment has a capability which enables it to add the various increments of billing information necessary to select the pulse repetition rate which is appropriate to bill for the use of the desired combination of distance and equipment.

The increments for selection of billing rates may be added in the following manner. If a wide band service type of equipment is used, the line circuit can seize only a wide band link circuit **53*b*. If a narrow band service type of equipment is used, the line circuit can seize only a narrow band link 53*a***. Thus, each link is permanently equipped to select a particular billing rate that is unique to a particular kind of equipment.

In addition, the translator 63 is equipped to read out an equipment location responsive to the subscriber sent directory numbers. As part of this read out, a device (such as 124) in each link circuit is set to a particular reading which corresponds to the billing required for calling a particular distance through that particular line circuit. In greater detail, a number of common busses 125 extend through the office. Here, one bus 126 is shown as carrying an exemplary ten billing impulses per minute, and another bus 127 is shown as carrying an exemplary ninety billing impulses per minute. Any number of other busses (not shown) may be provided to carry any other suitable number of billing impulses as required.

When the call is first being established, the device 124 (which may be any known selector circuit) is driven responsive jointly to the read out of the translator 63 and to a permanent marking associated with the seized link containing the driven device 124. Thus, if, for example, the service type of equipment which can be connected through link **53*b* requires twenty pulses per minute and if the distance over which the call is transmitted requires twenty pulses per minute, the equipment in the link will select the bus which transmits forty pulses per minute. Thereafter, for the duration of the call, a bus in group 125 sends forty pulses per minute through the device 124 to the link circuit 53. The link 53 will send suitable signals either to meter 120 if subscriber metering is provided, or over conductor 114 to toll ticketer 115** if toll tickets are provided.

Briefly in resume, as shown in FIG. 18, the office common control equipment may control the switching of more than one service type of matrix with a resulting savings in both crosspoints and common control equipment. The identity of the link used during any call tells the equipment what the billing rate should be for the service type of esuipment used during the call. The link receives directory number signals which causes a selection of one pulse repetition rate which includes the service type of rate factor. Selection is made by picking one from among many sources of variable rates. Then the link sends out the billing pulses an a 1-to-1 ratio to either a subscriber meter or a toll ticketer.

Those skilled in the art will perceive many advantages growing out of the invention. Among others, the small matrices and standardized cable harness eliminates virtually all on site wiring. The traffic pattern may undergo gross changes without requiring more than a few changes in cable harnesses. Fully equipped matrices give homogeneous outflow traffic. A great variety of calls may be extended through many networks responsive to a single pool of common control equipment. Still other advantages will occur to those skilled in the art.

While the principles of the invention have been described above in connection with specific apparatus and applications, it is to be understood that this description is made only by way of example and not as a limitation on the scope of the invention.

We claim:

1. A switching network comprising:
a plurality of small fully equipped square matrices arranged in a primary stage,
a plurality of matrices having identical dimensions arranged in a cascaded secondary stage,
means comprising inter-stage grading cables for homogeneously distributing traffic from said primary stage to said secondary stage,
the wiring in said cables being laid out according to the following rules:
(1) wire all inlets of the secondary switches to outlets on the primary switches in a standard 1 to 1 pattern leaving surplus outlets unwired,
(2) connect the surplus primary outlets to inlets using double or triple wiring on the inlets by:
(A) chain connecting secondary inlets from a first inlet down to a last inlet to establish a normal order of inlet preference selection,
(B) wiring the surplus outlets to connect the lowest preference primary stage outlet with the lowest preference secondary stage inlet by doubling the wiring from the inlets,
(C) continue repeating step 2(B) by connecting the inlets and the surplus outlets in an inverse order of preference until all surplus primary outlets have been connected to inlets, and
(D) on the line side connecting the heaviest traffic users to the highest preference inlet and the lightest traffic users to the lowest preference inlet in the primary stages with intermediate traffic users connected to intermediate preference inlets in order of usage.

2. A switching network for interconnecting a demanding one of many inlets with any one of a few outlets,
thereby performing a concentration and a directional switching function,
said network comprising a first switching stage means for concentrating traffic and a second switching stage means for directing said concentrated traffic to a selected location,
said concentration switching means comprising a plurality of small, fully equipped square matrices arranged in a primary stage,
a plurality of matrices having identical dimensions arranged in a cascaded secondary stage,
whereby said network comprises a plurality of cascaded switching stages including a plurality of matrices having identical dimensions for any given stage, and
means for changing network capacity by adding or subtracting matrices in one of said stages and selecting a particular type of cable having intra-cable wiring arranged to interconnect the resulting number of inlets and outlets for homogeneous traffic flow.

3. The network of claim 2 wherein said intra-cable wiring is arranged for selectively connecting a plurality of outlets from said primary stage to individual inlets in said secondary stage,
these plural connections being laid out in said cable according to the following rules:
(1) wire all inlets of the secondary switches to outlets on the primary switches in a standard 1 to 1 pattern leaving surplus outlets unwired,
(2) connect the surplus primary outlets to inlet using double or triple wiring on the inlets by:
(A) chain connecting secondary inlets from a first inlet down to a last inlet to establish a normal order of inlet preference selection,
(B) wiring the surplus outlets to connect the lowest preference primary stage outlet with the lowest preference secondary stage inlet by doubling the wiring from the inlets, (C) continue repeating step 2(B) by connecting the inlets and the surplus outlets in an inverse order of preference until all surplus primary outlets have been connected to inlets, and (D) on the line side connecting the heaviest traffic users to the highest preference inlet and the lightest traffic users to the lowest preference inlet in the primary stages with intermediate traffic users connected to intermediate preference inlets in order of usage.

4. A switching network comprising a concentration means having a plurality of small, fully equipped matrices arranged in a primary stage, a plurality of matrices having identical dimensions arranged in a cascaded second stage, interstage grading cable means for homogeneously distributing traffic from said primary stage to said secondary stage, and mixing stage means comprising a tertiary one of said stages for mixing the outflow of traffic from said secondary stage into a homogeneous outflow of traffic despite any dissimilarity of characteristics of the inflow of traffic.

5. The network of claim 4 and a directional switching network, means for interconnecting any outlet from said mixing stage means with a selected outlet of said directional switching network.

6. The network of claim 5 and means for selectively connecting together any one of many different types of equipments to interface said network with any one of many different types of switching systems.

7. The network of claim 5 wherein said concentration means is remotely located with respect to said directional stage.

8. The network of claim 7 and means for scanning said lines in said remote concentrator for line identifying signals, register means associated with said directional stage, means for forwarding said line identifying signals to the register, a plurality of toll ticketers associated with said register via common busses, and means for reading out said line identifying signals over said common busses to said toll ticketer.

9. The network of claim 4 and means for detecting the class of service given to an individual call in said traffic, means for forwarding a signal indicating said detected class of service to a distant location where said traffic terminates, and means at the distant location for making a compatibility check to determine whether the call may be completed.

10. A switching network comprising a plurality of cascaded stages having a plurality of matrix switches, each of said switches being capable of transmitting signals of one service type of equipment, with matrix dimensions which are uniform for each stage, cable means for interconnecting at least two of said stages, there being a plurality of interchangeable types of said cable means whereby different numbers of switches in said two stages may be interconnected, means for wiring said cables in a manner which distributes traffic through said stages in a homogeneous manner, and common control means for selectively controlling the matrix switches for any of said service type of equipment.

11. An automatic switching network comprising means for making connections through different service types of equipment, a plurality of common busses extending by said equipments, means for transmitting billing pulses over said busses, said billing pulses having a different pulse repetition rate on each of said busses, means associated with said equipments for seizing a particular one of said busses having billing pulses thereon with a repetition rate corresponding to the billing charge for the service type of equipment being used, and means responsive to said billing pulses for storing a record of the billing charge for a call.

12. The network of claim 11 and means for further selecting a bus with a higher pulse repetition rate which corresponds to the distance over which said call is extended.

13. The office of claim 12 and means for detecting the class of service given to an individual call, means for forwarding a signal indicating said detected class of service to a distant end of a line, and means at the distant end of said line for making a compatibility check to determine whether the call may be completed.

References Cited

UNITED STATES PATENTS

| | | | |
|---|---|---|---|
| 3,129,291 | 4/1964 | Brooks et al. | 179—18 |
| 3,190,968 | 6/1965 | Krom | 179—18 |
| 3,206,553 | 9/1965 | Lucas et al. | 179—18 |
| 3,257,513 | 6/1966 | Feiner | 179—18 |

KATHLEEN H. CLAFFY, Primary Examiner

ALBIN H. GESS, Assistant Examiner